United States Patent
Matsumoto et al.

(10) Patent No.: US 11,292,491 B2
(45) Date of Patent: Apr. 5, 2022

(54) SERVER AND VEHICLE CONTROL SYSTEM

(71) Applicant: Hitachi, Ltd., Tokyo (JP)

(72) Inventors: Takashi Matsumoto, Tokyo (JP); Tsuneo Sobue, Tokyo (JP); Akihiro Kondo, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 109 days.

(21) Appl. No.: 16/798,804

(22) Filed: Feb. 24, 2020

(65) Prior Publication Data

US 2020/0276984 A1 Sep. 3, 2020

(30) Foreign Application Priority Data

Feb. 28, 2019 (JP) .............................. JP2019-036565

(51) Int. Cl.
*B60W 60/00* (2020.01)
*H04W 4/40* (2018.01)
(Continued)

(52) U.S. Cl.
CPC ........ *B60W 60/0011* (2020.02); *B60W 40/02* (2013.01); *G05D 1/0214* (2013.01);
(Continued)

(58) Field of Classification Search
None
See application file for complete search history.

(56) References Cited

U.S. PATENT DOCUMENTS 9,632,502 B1 * 4/2017 Levinson ................ G06N 20/00
11,186,174 B2 * 11/2021 Koebler .................. B60L 50/62
(Continued)

FOREIGN PATENT DOCUMENTS

| EP | 2 876 025 A2 | 5/2015 |
| JP | 2016115143 A * | 6/2016 |
| JP | 2018-531385 A | 10/2018 |

OTHER PUBLICATIONS

Hitomi Kentaro, Machine Translation of JP-2016115143-A, Jun. 2016, espacenet.com (Year: 2016).*

(Continued)

*Primary Examiner* — David P. Merlino
(74) *Attorney, Agent, or Firm* — Crowell & Moring LLP

(57) ABSTRACT

A server includes: a candidate trajectory generation part for generating a candidate traveling trajectory of a target vehicle; a trajectory simulator for executing a trajectory simulation on the candidate traveling trajectory generated by the candidate trajectory generation part; a trajectory evaluation part for determining a traveling trajectory based on a result of the trajectory simulation; a vehicle coordination part for transmitting information of the traveling trajectory determined by the trajectory evaluation part to an onboard device; an infrastructure coordination part for obtaining sensing information from an infrastructure sensor; an ambient environment generation part for generating information indicating an ambient environment of the traveling trajectory, based on the sensing information obtained by the infrastructure coordination part; and a resetting determination part for determining whether to reset the traveling trajectory.

15 Claims, 4 Drawing Sheets

(51) Int. Cl.
*B60W 40/02* (2006.01)
*G05D 1/02* (2020.01)
*G08G 1/0968* (2006.01)

(52) U.S. Cl.
CPC . *G08G 1/096827* (2013.01); *G08G 1/096844* (2013.01); *H04W 4/40* (2018.02); *B60W 2555/20* (2020.02); *B60W 2556/50* (2020.02)

(56) References Cited

U.S. PATENT DOCUMENTS

| | | | |
|---|---|---|---|
| 2007/0088469 A1* | 4/2007 | Schmiedel | G05D 1/0274 |
| | | | 701/23 |
| 2007/0225902 A1* | 9/2007 | Gretton | G08G 1/096861 |
| | | | 701/533 |
| 2016/0075333 A1* | 3/2016 | Sujan | B60W 10/02 |
| | | | 701/25 |
| 2017/0277193 A1* | 9/2017 | Frazzoli | G05D 1/0088 |
| 2017/0315551 A1* | 11/2017 | Mimura | B62D 15/025 |
| 2018/0024553 A1* | 1/2018 | Kong | G05D 1/0088 |
| | | | 701/26 |
| 2019/0009819 A1 | 1/2019 | Ishioka et al. | |
| 2020/0208998 A1* | 7/2020 | Xiang | G01C 21/3461 |

OTHER PUBLICATIONS

Extended European Search Report issued in European Application No. 20159768.9 dated Jul. 20, 2020 (eight pages).

* cited by examiner

FIG. 1
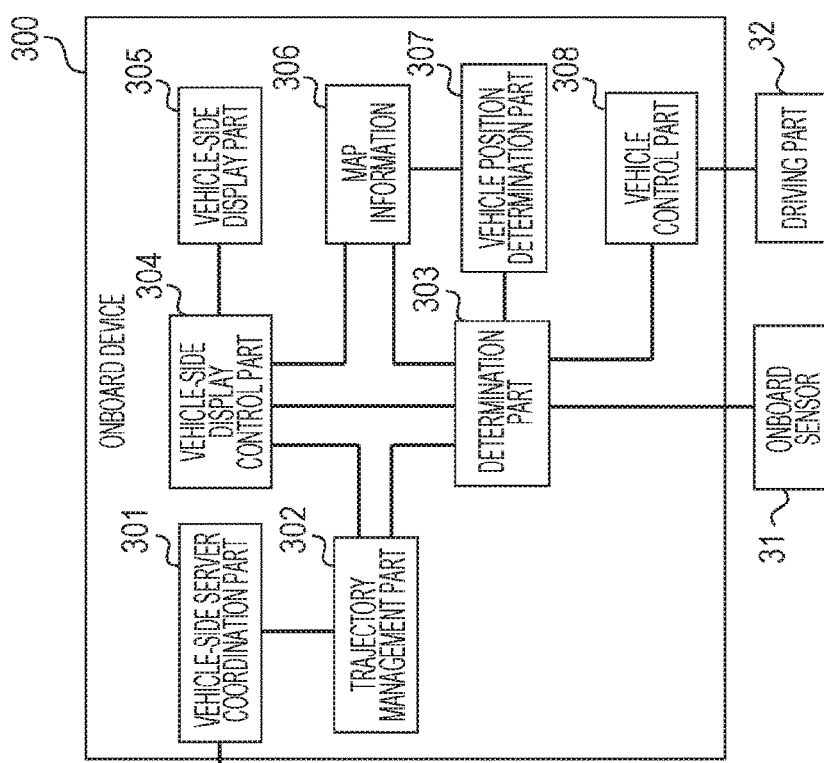
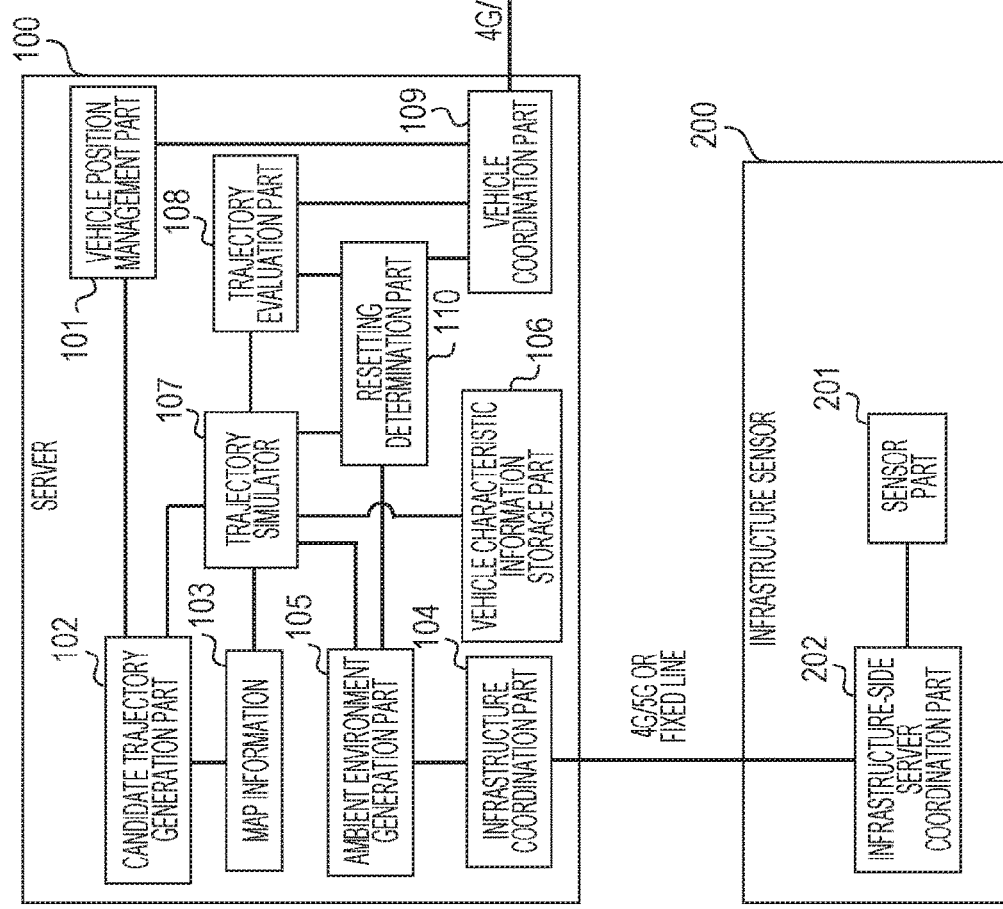

SERVER AND VEHICLE CONTROL SYSTEM

BACKGROUND OF THE INVENTION

1. Field of the Invention

The present invention relates to a server and a vehicle control system.

2. Description of the Related Art

There has been proposed a technique for setting a traveling trajectory from a current position of a vehicle to a designated position and causing the vehicle to move autonomously along the traveling trajectory without driver's driving operation. For example, JP 2018-531385 A discloses a data processing system for determining an optimal route by executing, in view of physical characteristics of an autonomous vehicle, a simulation of a route on each of routes being described in motion planning and control data indicating that the autonomous vehicle is to move from a first point to a second point and extending from the first point to the second point.

SUMMARY OF THE INVENTION

The determination of the optimal traveling trajectory for the vehicle to perform autonomous movement may be affected not only by the physical characteristics of the vehicle but also by an ambient environment of the vehicle. Therefore, in a case where the ambient environment changes with the lapse of time, even a traveling trajectory determined as optimal once is not always optimal at a timing when the vehicle actually travels. However, according to the technique of JP 2018-531385 A, even in a case where the traveling trajectory that has been set once becomes non-optimal due to changes in the ambient environment, it is impossible to reset the optimal traveling trajectory.

According to a first aspect of the present invention, a server includes: a candidate trajectory generation part configured to generate a candidate traveling trajectory of a vehicle; a vehicle characteristic information storage part configured to store characteristic information of the vehicle; a trajectory simulator configured to execute, on the candidate traveling trajectory generated by the candidate trajectory generation part, a trajectory simulation involving use of the characteristic information; a trajectory evaluation part configured to determine a traveling trajectory along which the vehicle is caused to move autonomously, based on a result of the trajectory simulation performed by the trajectory simulator; a vehicle coordination part having a communication function to communicate with an onboard device mounted on the vehicle and being configured to transmit information of the traveling trajectory determined by the trajectory evaluation part to the onboard device; an infrastructure coordination part having a communication function to communicate with an infrastructure sensor which is configured to generate sensing information about an area surrounding the traveling trajectory, and being configured to obtain the sensing information from the infrastructure sensor; an ambient environment generation part configured to generate information indicating an ambient environment of the traveling trajectory, based on the sensing information obtained by the infrastructure coordination part; a resetting determination part configured to determine whether to reset the traveling trajectory, wherein the trajectory simulator executes a trajectory simulation again with use of the information indicating the ambient environment generated by the ambient environment generation part, in a case where the resetting determination part determines to reset the traveling trajectory, the trajectory evaluation part determines a new traveling trajectory of the vehicle based on a result of the trajectory simulation performed again by the trajectory simulator, and the vehicle coordination part transmits, to the onboard device, information of the new traveling trajectory determined by the trajectory evaluation part.

According to a second aspect of the present invention, a vehicle control system includes: a server configured to set a traveling trajectory along which a vehicle is caused to move autonomously; an onboard device mounted on the vehicle; and an infrastructure sensor capable of generating sensing information about an area surrounding the traveling trajectory, wherein the server includes a candidate trajectory generation part configured to generate a candidate traveling trajectory of the vehicle, a vehicle characteristic information storage part configured to store characteristic information of the vehicle, a trajectory simulator configured to execute, on the candidate traveling trajectory generated by the candidate trajectory generation part, a trajectory simulation involving use of the characteristic information, a trajectory evaluation part configured to determine a traveling trajectory based on a result of the trajectory simulation performed by the trajectory simulator, a vehicle coordination part having a communication function to communicate with the onboard device and being configured to transmit information of the traveling trajectory determined by the trajectory evaluation part to the onboard device, an infrastructure coordination part having a communication function to communicate with the infrastructure sensor and being configured to obtain the sensing information from the infrastructure sensor, an ambient environment generation part configured to generate information indicating an ambient environment of the traveling trajectory, based on the sensing information obtained by the infrastructure coordination part, and a resetting determination part configured to determine whether to reset the traveling trajectory, the infrastructure sensor includes a sensor part configured to generate the sensing information, and an infrastructure-side server coordination part configured to transmit the sensing information to the server, the onboard device includes a vehicle-side server coordination part configured to obtain information of the traveling trajectory from the server, and a vehicle control part configured to cause the vehicle to move autonomously along the traveling trajectory based on the information of the traveling trajectory obtained by the vehicle-side server coordination part, the trajectory simulator executes a trajectory simulation again with use of the information indicating the ambient environment generated by the ambient environment generation part, in a case where the resetting determination part determines to reset the traveling trajectory, the trajectory evaluation part determines a new traveling trajectory of the vehicle based on a result of the trajectory simulation performed again by the trajectory simulator, and the vehicle coordination part transmits, to the onboard device, information of the new traveling trajectory determined by the trajectory evaluation part.

According to the present invention, it is possible to set an optimal traveling trajectory again according to a change in an ambient environment.

BRIEF DESCRIPTION OF DRAWINGS

FIG. 1 is a view illustrating a configuration of a vehicle control system according to a first embodiment of the present invention;

DESCRIPTION OF THE PREFERRED EMBODIMENTS

First Embodiment

Figure 2:
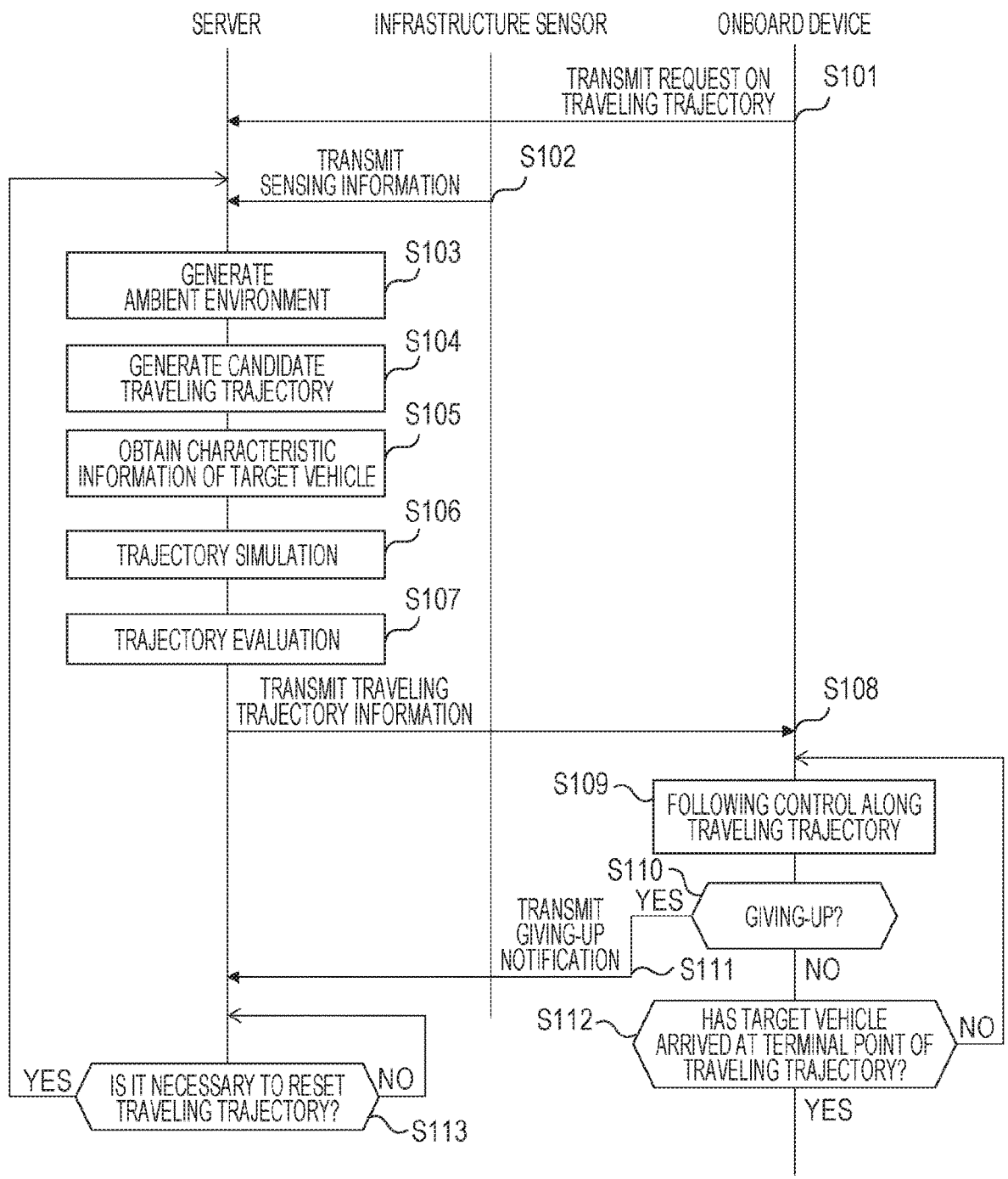
FIG. 2 is a sequence diagram of an autonomous movement control.

FIG. 1 is a view illustrating a configuration of a vehicle control system according to a first embodiment of the present invention. A vehicle control system 1 illustrated in FIG. 1 includes a server 100, an infrastructure sensor 200, and an onboard device 300. The vehicle control system 1 performs a control to set, for a vehicle on which the onboard device 300 is mounted, a traveling trajectory leading to a designated point and to cause the vehicle to move autonomously. In the description below, the vehicle that is to be controlled by the vehicle control system 1, i.e., the vehicle on which the onboard device 300 is mounted is referred to as a "target vehicle".

The server 100 is information equipment for setting a traveling trajectory along which the target vehicle is caused to move autonomously and transmitting the traveling trajectory to the target vehicle. The server 100 is installed in a predetermined facility, such as an information center. The server 100 includes functional blocks including a vehicle position management part 101, a candidate trajectory generation part 102, map information 103, an infrastructure coordination part 104, an ambient environment generation part 105, a vehicle characteristic information storage part 106, a trajectory simulator 107, a trajectory evaluation part 108, a vehicle coordination part 109, and a resetting determination part 110. The server 100 has a hardware structure including a CPU, a memory, and a storage (e.g., HDD, SSD), each of which is not illustrated. With use of these pieces of hardware, the server 100 executes a predetermined program to achieve the functional blocks described above.

The infrastructure sensor 200 is installed near the traveling trajectory that is to be set by the server 100. The infrastructure sensor 200 detects, at a location outside the target vehicle, an obstacle existing in an area surrounding the traveling trajectory. FIG. 1 shows only one infrastructure sensor 200. Alternatively, a plurality of infrastructure sensors 200 may be installed near the traveling trajectory. The infrastructure sensor 200 includes functional blocks including a sensor part 201 and an infrastructure-side server coordination part 202.

The onboard device 300 is installed on the target vehicle. The onboard device 300 performs a control required to cause the target vehicle to move autonomously to the designated point along the traveling trajectory provided by the server 100. FIG. 1 shows only one onboard device 300. Alternatively, two or more vehicles may include their respective onboard devices 300, each of which constitutes the vehicle control system 1 in combination with the server 100 and the infrastructure sensor 200. The onboard device 300 includes functional blocks including a vehicle-side server coordination part 301, a trajectory management part 302, a determination part 303, a vehicle-side display control part 304, a vehicle-side display part 305, map information 306, a vehicle position determination part 307, and a vehicle control part 308.

Next, the following will describe the functional blocks of the server 100, the infrastructure sensor 200, and the onboard device 300.

In the server 100, the vehicle position management part 101 manages positions of the vehicles on which the onboard devices 300 are mounted. For example, the vehicle position management part 101 manages the positions of the vehicles by storing and retaining pieces of position information of the vehicles in association with unique vehicles IDs preliminarily assigned to the vehicles. The positions of the vehicles are uprated as appropriate according to pieces of position information supplied from the onboard device 300.

The candidate trajectory generation part 102 uses the map information 103 to generate a candidate traveling trajectory, which is a candidate of a traveling trajectory along which the target vehicle is caused to move autonomously. For example, the candidate trajectory generation part 102 obtains information indicating a current position of the target vehicle from the onboard device 300, and generates a plurality of candidate traveling trajectories used to cause the target vehicle to move autonomously from the obtained current position to a designated parking position and to park the target vehicle at the designated parking position. The candidate traveling trajectories may be generated with use of information indicating an ambient environment of the target vehicle generated by the ambient environment generation part 105 based on sensing information obtained from the infrastructure sensor 200 and/or various information (e.g., traffic information, weather information) obtained externally. It should be noted that the candidate traveling trajectories generated by the candidate trajectory generation part 102 may include a traveling trajectory along which the target vehicle cannot actually travel (e.g., a candidate traveling trajectory including an obstacle in its midway, a traveling trajectory in which the target vehicle cannot be steered).

The map information 103 is information indicating a map of a region in which the target vehicle moves autonomously. The map information 103 is stored in a storage, such as HDD or SDD, in the server 100. For example, the map information 103 includes road map information of various areas in the country, map information of the areas inside car parks, and/or the like. In order to set a traveling trajectory along which the target vehicle can move autonomously and correctly based on the map information 103, the map information 103 is preferably the one that is more precise than map information generally used in conventional navigation devices and/or the like.

The infrastructure coordination part 104 has a communication function to communicate with the infrastructure sensor 200. The infrastructure coordination part 104 receives information from the infrastructure sensor 200 and to transmit information to the infrastructure sensor 200. The infrastructure coordination part 104 can communicate with the infrastructure sensor 200, e.g., via a mobile communication network (4G, 5G) or a fixed line.

The ambient environment generation part 105 generates information indicating an ambient environment of the target vehicle and the traveling trajectory based on the sensing information transmitted from the infrastructure sensor 200 and received by the infrastructure coordination part 104. The information indicating the ambient environment generated by the ambient environment generation part 105 can be obtained by performing a predetermined calculating process with use of the sensing information transmitted from the infrastructure sensor 200, the sensing information being information indicating the positions, sizes, shapes, and/or the like of various obstacles and background objects (e.g., other vehicles, parked vehicles, pedestrians, bicycles, traffic signals, telegraph poles, road signs, street trees, and signboards) existing around the target vehicle and/or the traveling trajectory. The information indicating the ambient environment may be generated by any method, as long as the method can generate ambient environment information that can accurately represent at least an obstacle interfering with the traveling trajectory, if present.

The vehicle characteristic information storage part 106 stores and retains characteristic information of various vehicles including the target vehicle. The characteristic information is information indicating characteristics of the vehicles related to autonomous movement, and includes information indicating the sizes, weights, yaw inertia moments, distances between axles, gravity center positions, and cornering power, for example.

The trajectory simulator 107 executes, on each of the candidate traveling trajectories generated by the candidate trajectory generation part 102, a trajectory simulation involving use of the characteristic information of the target vehicle stored in the vehicle characteristic information storage part 106. The trajectory simulator 107 performs the trajectory simulation by calculating behaviors of the target vehicle that is moving autonomously along each of the candidate traveling trajectories with use of, e.g., the map information 103 and/or the information indicating the ambient environment generated by the ambient environment generation part 105. The trajectory simulation may be performed in consideration of external factors, such as the conditions of a road surface and/or behaviors of an obstacle existing in its surrounding area.

The trajectory evaluation part 108 determines a traveling trajectory along which the target vehicle is caused to move autonomously, based on the results of the trajectory simulations performed by the trajectory simulator 107. For example, the trajectory evaluation part 108 sets evaluation values on the candidate traveling trajectories based on the behaviors of the target vehicle in the candidate traveling trajectories obtained as a result of the trajectory simulations, and determines, as a traveling trajectory of the target vehicle, a candidate traveling trajectory having the lowest evaluation value, i.e., a candidate traveling trajectory that gives the lowest load on the target vehicle. Instead of this, the evaluation may be performed by any method, as long as the method can determine a traveling trajectory from among the plurality of candidate traveling trajectories based on the results of the trajectory simulations.

The vehicle coordination part 109 has a communication function to communicate with the onboard device 300. The vehicle coordination part 109 receives the position information of the target vehicle from the onboard device 300, and transmits the information of the traveling trajectory determined by the trajectory evaluation part 108 to the onboard device 300. The vehicle coordination part 109 can communicate with the onboard device 300, e.g., via a mobile communication network (4G, 5G).

The resetting determination part 110 determines whether to reset the traveling trajectory determined by the trajectory evaluation part 108, based on the current situation of the target vehicle. If the resetting determination part 110 determines to reset the traveling trajectory, the server 100 executes, via the trajectory simulator 107, trajectory simulations again. Then, the server 100 determines, via the trajectory evaluation part 108, a new traveling trajectory of the target vehicle based on the result of the trajectory simulation. Then, the vehicle coordination part 109 transmits the information of the new traveling trajectory thus determined to the onboard device 300. The method how the resetting determination part 110 determines whether to reset the traveling trajectory will be described in detail later.

In the infrastructure sensor 200, the sensor part 201 is constituted by various sensors, such as a camera, a radar, light detection and ranging (LiDAR). The sensor part 201 generates sensing information corresponding to a predetermined sensing range of the sensors based on the position where the infrastructure sensor 200 is installed. The sensing information includes information of an obstacle existing in the sensing range.

The infrastructure-side server coordination part 202 has a communication function to communicate with the server 100. The infrastructure-side server coordination part 202 transmits the sensing information generated by the sensor part 201 to the server 100. The infrastructure-side server coordination part 202 can communicate with the infrastructure coordination part 104 of the server 100, e.g., via a mobile communication network (4G, 5G) or a fixed line.

In the onboard device 300, the vehicle-side server coordination part 301 has a communication function to communicate with the server 100. The vehicle-side server coordination part 301 transmits the position information of the target vehicle to the server 100, and receives the information on the traveling trajectory transmitted from the server 100. The vehicle-side server coordination part 301 can communicate with the vehicle coordination part 109 of the server 100, e.g., via a mobile communication network (4G, 5G).

The trajectory management part 302 manages the traveling trajectory along which the target vehicle moves autonomously according to the information on the traveling trajectory transmitted from the server 100. If the resetting determination part 110 in the server 100 determines to reset the traveling trajectory in the above-described manner and accordingly a new traveling trajectory determined is transmitted from the server 100 and received by the vehicle-side server coordination part 301, the trajectory management part 302 discards the existing traveling trajectory and sets the new traveling trajectory according to the received information.

The determination part 303 determines a motion required to cause the target vehicle to move autonomously along the traveling trajectory managed by the trajectory management part 302, based on the map information 306 and information indicating the current position of the target vehicle determined by the vehicle position determination part 307. For example, the determination part 303 determines the speed, the acceleration, and the steering amount of the target vehicle based on the length and/or the curvature of the traveling trajectory. The determination may be made further based on information on an area surrounding the target vehicle obtained from an onboard sensor 31. For example, if an obstacle existing in front of the target vehicle is detected, a determination may be made to apply emergency braking.

The vehicle-side display control part 304 generates a screen to be displayed on the vehicle-side display part 305, based on the map information 306, the traveling trajectory managed by the trajectory management part 302, and the determination result of the determination part 303. The vehicle-side display part 305 is made of a liquid crystal display, for example. The vehicle-side display part 305 displays the screen generated by the vehicle-side display control part 304 to give a notification to a passenger on the target vehicle. With this configuration, for example, the vehicle-side display part 305 displays a screen indicating a traveling trajectory on a map or a screen notifying the passenger on the target vehicle of the fact that the traveling trajectory has been reset or the fact that an obstacle has been detected, if this happens. Alternatively, a sound from a speaker (not illustrated) may be used in combination with or instead of the screen on the vehicle-side display part 305 to give a notification to the passenger.

Similarly to the map information 103 of the server 100, the map information 306 is information indicating a map of a region where the target vehicle moves autonomously, and is stored in a not-illustrated storage (e.g., HDD, SDD) in the onboard device 300. The map information 306 is used by the determination part 303 to make a determination on a motion of the target vehicle and/or by the vehicle-side display control part 304 to generate a map screen, for example. Similarly to the map information 103 of the server 100, the map information 306 is preferably the one that is more precise than a generally-used conventional map.

The vehicle position determination part 307 determines the position of the target vehicle based on a GPS signal received by a GPS sensor (not illustrated) and/or information (e.g., a speed, an acceleration, a steering amount) about an operating state of the target vehicle detected by the onboard sensor 31. The map information 306 may be used to perform a well-known map matching process to position the target vehicle on a road. The position information of the target vehicle determined by the vehicle position determination part 307 is transmitted to the server 100 by the vehicle-side server coordination part 301, and is used by the vehicle position management part 101 to manage the position of the target vehicle.

The vehicle control part 308 performs a control on the target vehicle based on the result of the determination on the motion of the target vehicle which determination has been made by the determination part 303. The vehicle control part 308 is connected to a driving part 32 of the target vehicle. The vehicle control part 308 controls the driving part 32 to execute an acceleration operation, a braking operation, a steering operation, or the like of the target vehicle. In this manner, the vehicle control part 308 controls the operating state of the target vehicle according to the determination result of the determination part 303.

Figure 3:
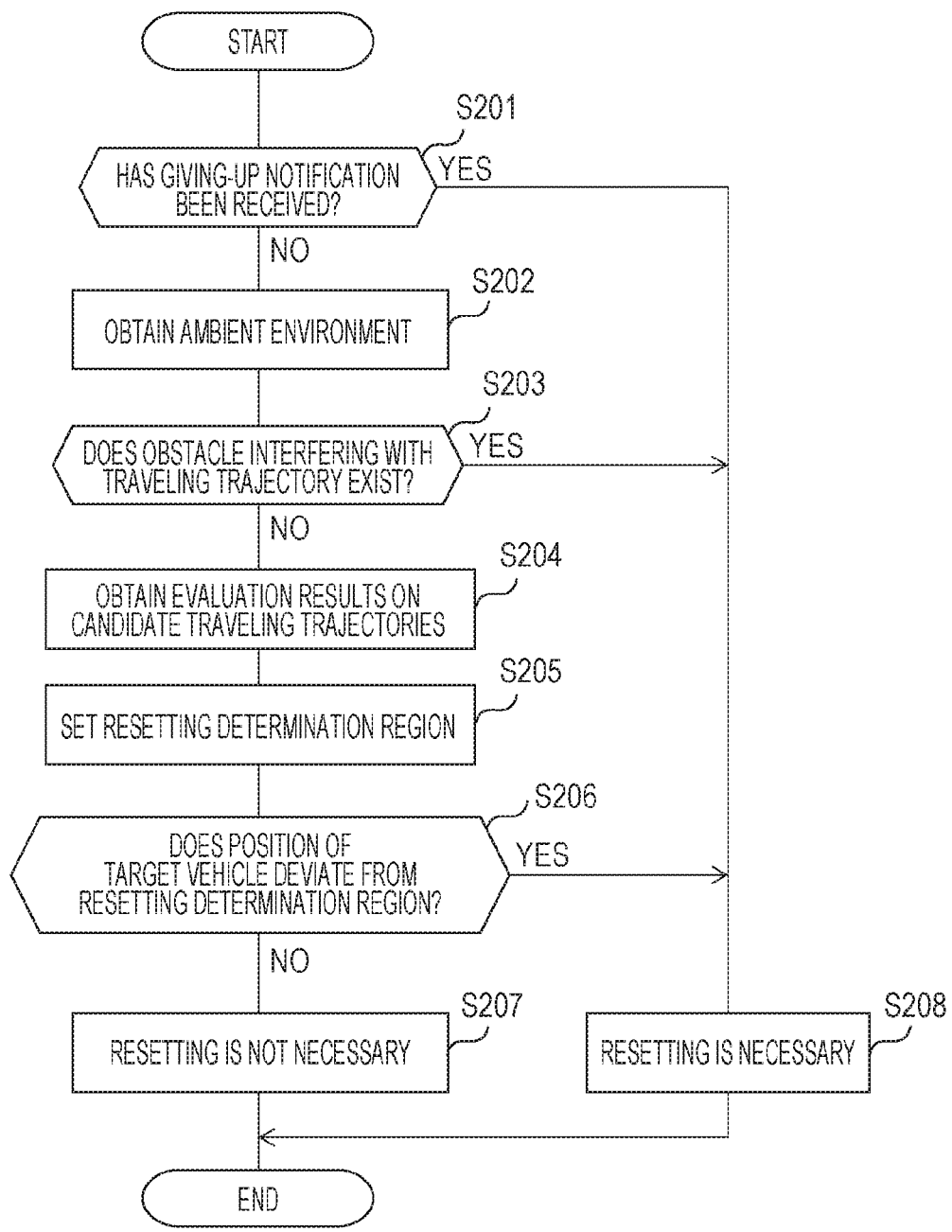
FIG. 3 is a flowchart illustrating a resetting determination process for a traveling trajectory.

Next, with reference to FIGS. 2 and 3, the following will describe specific examples of an autonomous movement control performed by the vehicle control system 1 according to the present embodiment.

FIG. 2 is a sequence diagram of the autonomous movement control performed by the vehicle control system 1.

In step S101, the onboard device 300 transmits, via the vehicle-side server coordination part 301, a request on a traveling trajectory to the server 100. The onboard device 300 transmits the request on the traveling trajectory to the server 100 by executing step S101, if the passenger on the target vehicle gives an instruction to execute automatic parking or automatic driving or a determination or if a new traveling trajectory is determined to be necessary during automatic driving, for example. The request on the traveling trajectory includes information indicating a target point (e.g., a parking position, a point where a control for automatic driving is performed), which is a destination of the autonomous movement of the target vehicle. The server 100 receives, via the vehicle coordination part 109, the request on the traveling trajectory transmitted from the onboard device 300.

In step S102, the infrastructure sensor 200 transmits, via the infrastructure-side server coordination part 202, the sensing information generated by the sensor part 201 to the server 100. The server 100 receives, via the infrastructure coordination part 104, the sensing information transmitted from the infrastructure sensor 200.

In step S103, the server 100 generates, via the ambient environment generation part 105, information indicating an ambient environment of the target vehicle, based on the sensing information received from the infrastructure sensor 200 in step S102.

In step S104, the server 100 generates, via the candidate trajectory generation part 102, candidate traveling trajectories from which the traveling trajectory is obtained. In this process, the candidate trajectory generation part 102 obtains the information indicating the current position of the target vehicle from the vehicle position management part 101, and generates a plurality of candidate traveling trajectories located between the current position and the target point included in the request received in step S101.

In step S105, the server 100 obtains, via the trajectory simulator 107, characteristic information of the target vehicle from the vehicle characteristic information storage part 106. In this process, the trajectory simulator 107 obtains, as the characteristic information of the target vehicle, a piece of characteristic information of a vehicle including the onboard device 300 that has transmitted the request on the traveling trajectory in step S101, from among the pieces of characteristic information of the vehicles stored in the vehicle characteristic information storage part 106.

In step S106, the server 100 executes, via the trajectory simulator 107, a trajectory simulation on each of the candidate traveling trajectories generated in step S104. In this process, the trajectory simulator 107 executes a trajectory simulation of calculating behaviors of the target vehicle that is moving autonomously along each of the candidate traveling trajectories, based on the information indicating the ambient environment generated in step S103 and the characteristic information of the target vehicle obtained in step S105.

In step S107, the server 100 performs, via the trajectory evaluation part 108, trajectory evaluations on the results of the trajectory simulations executed in step S106. In this process, the trajectory evaluation part 108 sets evaluation values on the candidate traveling trajectories based on the behaviors of the target vehicle in the candidate traveling trajectories obtained as a result of the trajectory simulations in the above-described manner, for example. Then, the trajectory evaluation part 108 determines, as the traveling trajectory of the target vehicle, a candidate traveling trajectory whose evaluation value is lower than those of any other candidate traveling trajectories.

In step S108, the server 100 transmits, via the vehicle coordination part 109, the information of the traveling trajectory determined in step S107 to the onboard device 300. The onboard device 300 receives, via the vehicle-side server coordination part 301, the traveling trajectory information transmitted from the server 100.

In step S109, the onboard device 300 executes a control for causing the target vehicle to move autonomously following the traveling trajectory, based on the traveling trajectory information received from the server 100 in step S108. In this process, the onboard device 300 causes the trajectory management part 302 to store and retain the received traveling trajectory information, and causes the determination part 303 and the vehicle control part 308 to control the operating state of the target vehicle. In this manner, the onboard device 300 causes the target vehicle to move autonomously following the traveling trajectory.

In step S110, the onboard device 300 determines, via the determination part 303, whether to give up the autonomous movement of the target vehicle. In this process, during the control in step S109, the onboard device 300 determines whether or not the target vehicle cannot move autonomously along the traveling trajectory any more. If the onboard device 300 determines that such a situation occurs, the onboard device 300 determines to give up the autonomous movement of the target vehicle. This situation may be, for example, a situation where the onboard sensor 31 detects an obstacle on the traveling trajectory, a situation where the target vehicle is away from the traveling trajectory by a predetermined distance or more, or a situation where it is determined that the target vehicle cannot be steered. In an alternative configuration, the passenger on the target vehicle may perform a predetermined operation with respect to the onboard device 300 to choose giving up. If any of these situations occurs, the onboard device 300 determines to give up the autonomous movement of the target vehicle, and stops the control performed in step S109. Then, the process advances to step S111. Meanwhile, if none of these situations occurs, the onboard device 300 determines to continue the control performed in step S109, rather than giving up. Then, the process advances to step S112.

In step S111, the onboard device 300 transmits, via the vehicle-side server coordination part 301, a predetermined giving-up notification to the server 100. The server 100 receives, via the vehicle coordination part 109, the giving-up notification transmitted from the onboard device 300.

In step S112, the onboard device 300 determines, via the determination part 303, whether or not the target vehicle has arrived at the terminal point of the traveling trajectory, i.e., the target point of the autonomous movement, based on the information indicating the current position of the target vehicle determined by the vehicle position determination part 307. If the target vehicle has not arrived at the terminal point of the traveling trajectory, the process returns to step S109 to continue the control of the target vehicle. Meanwhile, if the target vehicle has arrived at the terminal point of the traveling trajectory, the sequence illustrated in FIG. 2 is ended.

In step S113, the server 100 determines, via the resetting determination part 110, whether to reset the traveling trajectory of the target vehicle. If the resetting determination part 110 determines not to reset the traveling trajectory, the process stays at step S113. Meanwhile, if the resetting determination part 110 determines to reset the traveling trajectory, the process returns to step S102 to reset the traveling trajectory. That is, based on the sensing information received from the infrastructure sensor 200, the server 100 generates, via the ambient environment generation part 105, information indicating an ambient environment of the target vehicle and the traveling trajectory corresponding to the current situation (step S103), and generates a plurality of candidate traveling trajectories again (step S104). Then, the server 100 executes trajectory simulations again based on the generated ambient environment information and the characteristic information of the target vehicle (step S106), and determines a new traveling trajectory of the target vehicle based on the results of the trajectory simulations (step S107). The information of the new traveling trajectory thus determined is transmitted from the server 100 to the onboard device 300 in step S108. Then, the trajectory management part 302 of the onboard device 300 updates the traveling trajectory of the target vehicle. The method how the resetting determination part 110 determines whether to reset the traveling trajectory will be described below with reference to the flowchart illustrated in FIG. 3.

FIG. 3 is a flowchart illustrating a resetting determination process for a traveling trajectory executed in step S113 in FIG. 2.

In step S201, the resetting determination part 110 determines whether or not the vehicle coordination part 109 has received the giving-up notification transmitted from the onboard device 300 in step S111 in FIG. 2. If the vehicle coordination part 109 has received the giving-up notification, the process advances to step S208. Meanwhile, if the vehicle coordination part 109 has not received the giving-up notification, the process advances to step S202.

In step S202, the resetting determination part 110 obtains the information indicating the ambient environment generated by the ambient environment generation part 105. In this process, the resetting determination part 110 obtains the information indicating the ambient environment of the traveling trajectory generated by the ambient environment generation part 105 based on the sensing information periodically transmitted from the infrastructure sensor 200. The information indicating the ambient environment of the traveling trajectory includes an obstacle that exists in an area surrounding the traveling trajectory but cannot be detected by the target vehicle, for example.

In step S203, the resetting determination part 110 determines the presence or absence of an obstacle interfering with the traveling trajectory based on the information indicating the ambient environment of the traveling trajectory obtained in step S202. In this process, the resetting determination part 110 determines, as an obstacle interfering with the traveling trajectory, an obstacle that exists near the traveling trajectory and that may potentially come into contact with the target vehicle, for example. The determination of whether or not the obstacle interferes with the traveling trajectory may be made in consideration of the characteristic information of the target vehicle stored in the vehicle characteristic information storage part 106, a motion of the obstacle in the ambient environment of the traveling trajectory, and/or the like. If the resetting determination part 110 determines that the obstacle interfering with the traveling trajectory exists, the process advances to step S208. Meanwhile, if the resetting determination part 110 determines that the obstacle interfering with the traveling trajectory does not exist, the process advances to step S204.

In step S204, the resetting determination part 110 obtains evaluation results of the trajectory simulations given by the trajectory evaluation part 108 in step S107 with respect to the candidate traveling trajectories generated by the candidate trajectory generation part 102 in step S104 in FIG. 2.

In step S205, the resetting determination part 110 sets a resetting determination region used for resetting determination on the traveling trajectory, based on the evaluation results of the candidate traveling trajectories obtained in step S204. In this process, for example, from among the plurality of candidate traveling trajectories whose evaluation results have been obtained, the resetting determination part 110 identifies paired left and right candidate traveling trajectories separated the farthest away from each other laterally across the current traveling trajectory, and sets, as a resetting determination region, a region defined by the paired candidate traveling trajectories. If the candidate traveling trajectories include a candidate traveling trajectory whose evaluation value is equal to or higher than a predetermined threshold value, it is preferable that such a candidate traveling trajectory be determined as the one along which the target vehicle cannot travel and be excluded from the objects that may be used to define the resetting determination region. With this configuration, the resetting determination part 110 can set the resetting determination region based on the position of the certain candidate traveling trajectory having been selected from among the plurality of candidate traveling trajectories, the certain candidate traveling trajectory being determined by the trajectory evaluation part 108 as the one along which the target vehicle can travel, the certain candidate traveling trajectory being separated farther away from the traveling trajectory than any other candidate traveling trajectories.

In step S206, the resetting determination part 110 determines whether or not the position of the target vehicle deviates from the resetting determination region set in step S205. If the position of the target vehicle stays within the resetting determination region, the process advances to step S207. Meanwhile, if the position of the target vehicle deviates from the resetting determination region, the process advances to step S208.

In step S207, the resetting determination part 110 determines it unnecessary to reset the traveling trajectory. In this case, in step S113 in FIG. 2, it is determined not to reset the traveling trajectory.

In step S208, the resetting determination part 110 determines it necessary to reset the traveling trajectory. In this case, in step S113 in FIG. 2, it is determined to reset the traveling trajectory.

If the determination result as to whether to reset the traveling trajectory of the target vehicle is obtained as a result of execution of step S207 or S208, the resetting determination part 110 ends the resetting determination process for the traveling trajectory, which is illustrated in the flowchart in FIG. 3.

The above-described first embodiment of the present invention brings about the following effects.

(1) The vehicle control system 1 includes: the server 100 configured to set a traveling trajectory along which the target vehicle is caused to move autonomously; the onboard device 300 mounted on the target vehicle; and the infrastructure sensor 200 capable of generating sensing information about an area surrounding the traveling trajectory. The server 100 includes: the candidate trajectory generation part 102 configured to generate a candidate traveling trajectory of the target vehicle; the vehicle characteristic information storage part 106 configured to store characteristic information of the target vehicle; the trajectory simulator 107 configured to execute, on the candidate traveling trajectory generated by the candidate trajectory generation part 102, a trajectory simulation involving use of the characteristic information of the target vehicle; the trajectory evaluation part 108 configured to determine the traveling trajectory based on a result of the trajectory simulation performed by the trajectory simulator 107; the vehicle coordination part 109 having a communication function to communicate with the onboard device 300 and being configured to transmit information of the traveling trajectory determined by the trajectory evaluation part 108 to the onboard device 300; the infrastructure coordination part 104 having a communication function to communicate with the infrastructure sensor 200 and being configured to obtain the sensing information from the infrastructure sensor 200; the ambient environment generation part 105 configured to generate information indicating an ambient environment of the traveling trajectory, based on the sensing information obtained by the infrastructure coordination part 104; and the resetting determination part 110 configured to determine whether to reset the traveling trajectory. The infrastructure sensor 200 includes: the sensor part 201 configured to generate the sensing information; and the infrastructure-side server coordination part 202 configured to transmit the sensing information to the server 100. The onboard device 300 includes: the vehicle-side server coordination part 301 configured to obtain the information of the traveling trajectory from the server 100; and the vehicle control part 308 configured to cause the target vehicle to move autonomously along the traveling trajectory based on the information of the traveling trajectory obtained by the vehicle-side server coordination part 301. The trajectory simulator 107 executes a trajectory simulation again with use of the information indicating the ambient environment generated by the ambient environment generation part 105 (step S106), if the resetting determination part 110 determines to reset the traveling trajectory (Yes in step S113). The trajectory evaluation part 108 determines a new traveling trajectory of the target vehicle based on a result of the trajectory simulation executed by the trajectory simulator 107 again (step S107). The vehicle coordination part 109 transmits, to the onboard device 300, information of the new traveling trajectory determined by the trajectory evaluation part 108 (step S108). Thanks to this configuration, it is possible to set a suitable traveling trajectory according to changes in the ambient environment.

(2) The onboard device 300 transmits predetermined information as a giving-up notification to the server 100, if the autonomous movement along the traveling trajectory is determined to be impossible (step S111). The resetting determination part 110 is configured to determine to reset the traveling trajectory (step S208), if the giving-up notification is transmitted from the onboard device 300 (Yes in step S201). Thanks to this configuration, it is possible to reliably determine to reset the traveling trajectory, if it becomes impossible for the target vehicle to move autonomously following the traveling trajectory any more.

(3) The resetting determination part 110 determines the presence or absence of an obstacle interfering with the traveling trajectory based on the sensing information (step S203), and determines whether to reset the traveling trajectory based on a result of the determination (step S207, S208). Thanks to this configuration, it is possible to reliably determine to reset the traveling trajectory, if the infrastructure sensor 200 detects an obstacle interfering with the traveling trajectory.

(4) The resetting determination part 110 sets, as a resetting determination region, a region of a predetermined range including the traveling trajectory (step S205), and determines to reset the traveling trajectory (step S208) if the position of the target vehicle deviates from the resetting determination region (Yes in step S206). Thanks to this configuration, it is possible to reliably determine to reset the traveling trajectory, if the target vehicle is greatly deviated from the traveling trajectory and cannot come back again to the traveling trajectory.

(5) The candidate trajectory generation part 102 is configured to generate a plurality of candidate traveling trajectories. The resetting determination part 110 sets the resetting determination region based on the position of a certain candidate traveling trajectory having been selected from among the plurality of candidate traveling trajectories, the certain candidate traveling trajectory being determined by the trajectory evaluation part 108 as the one along which the target vehicle can travel, the certain candidate traveling trajectory being separated farther away from the traveling trajectory than any other candidate traveling trajectories. Thanks to this configuration, it is possible to easily and appropriately set the resetting determination region with use of the results of the evaluations on the candidate traveling trajectories having been made when the trajectory evaluation part 108 determines the traveling trajectory.

Second Embodiment

Figure 4:
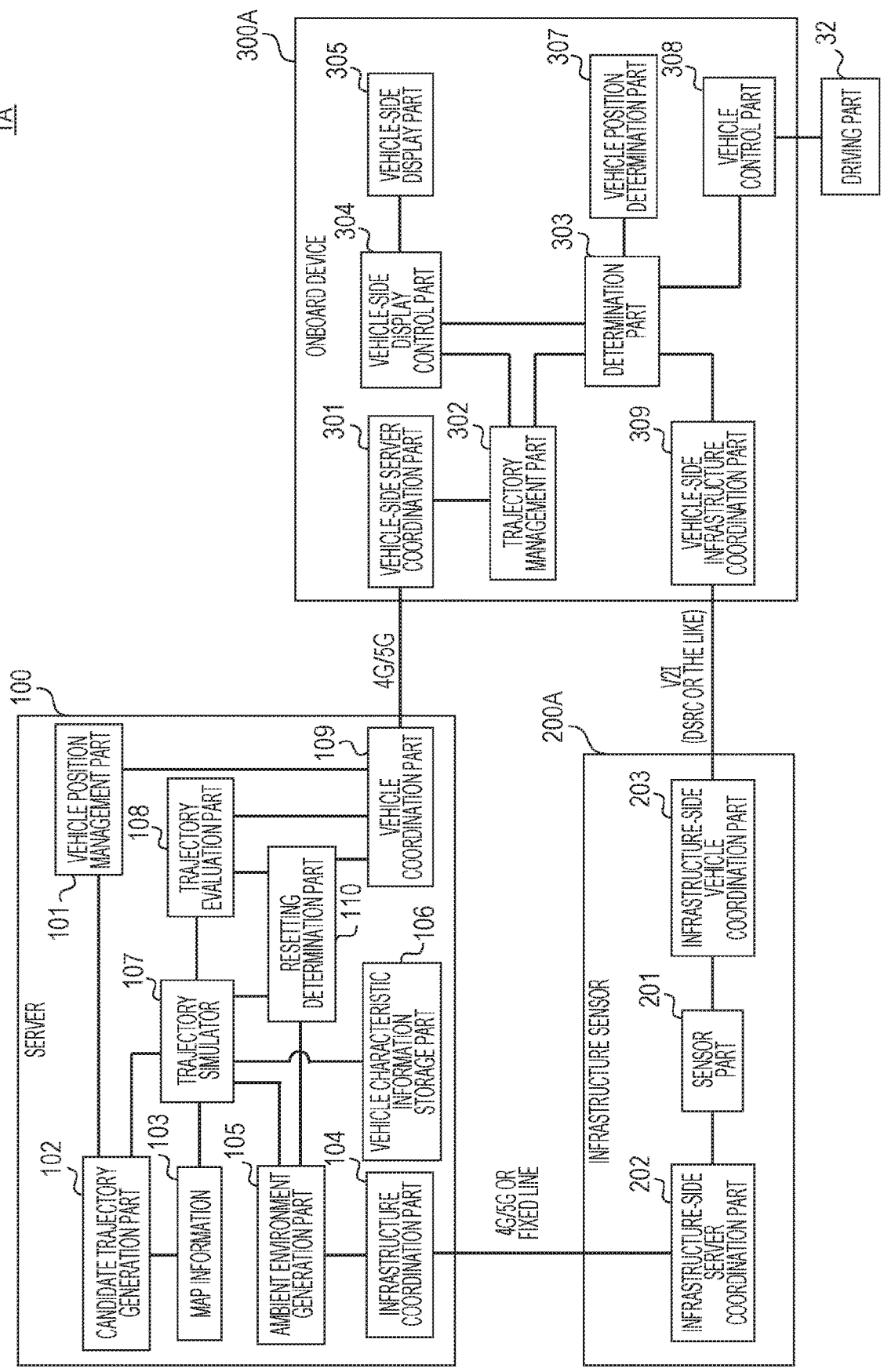
FIG. 4 is a view illustrating a configuration of a vehicle control system according to a second embodiment of the present invention.

FIG. 4 is a view illustrating a configuration of a vehicle control system according to a second embodiment of the present invention. A vehicle control system 1A illustrated in FIG. 4 includes a server 100, an infrastructure sensor 200A, and an onboard device 300A, and is configured to perform a control for setting, for a target vehicle on which the onboard device 300A is mounted, a traveling trajectory to a designated point and causing the target vehicle to move autonomously, in a similar manner to the vehicle control system 1 of the first embodiment. In the vehicle control system 1A of the present embodiment, the infrastructure sensor 200A further includes an infrastructure-side vehicle coordination part 203, and the onboard device 300A includes a vehicle-side infrastructure coordination part 309 instead of the map information 306 and is not connected to the onboard sensor 31. In these points, the vehicle control system 1A of the present embodiment is different from the vehicle control system 1 of the first embodiment. Focusing on these differences, the following will describe the vehicle control system 1A of the present embodiment.

The infrastructure-side vehicle coordination part 203 has a communication function to communicate with the onboard device 300A. The infrastructure-side vehicle coordination part 203 transmits sensing information generated by a sensor part 201 to the onboard device 300A. The infrastructure-side vehicle coordination part 203 can communicate with the onboard device 300A via road-vehicle communication, such as the one called Vehicle-to-Infrastructure (V2I) communication. As the road-vehicle communication, a communication standard such as Dedicated Short Range Communications (DSRC) may be employed.

The vehicle-side infrastructure coordination part 309 has a communication function to communicate with the infrastructure sensor 200A. The vehicle-side infrastructure coordination part 309 is configured to receive the sensing information transmitted from the infrastructure sensor 200A. The vehicle-side infrastructure coordination part 309 can communicate with the infrastructure-side vehicle coordination part 203 of the infrastructure sensor 200A via road-vehicle communication, such as the one called V2I.

In the present embodiment, the onboard device 300A uses, instead of the map information 306 and the information from the onboard sensor 31, the sensing information received by the vehicle-side infrastructure coordination part 309 from the infrastructure sensor 200A to cause the determination part 303 to make a determination on a motion of the target vehicle and to cause the vehicle control part 308 to perform a control on the target vehicle. For example, the determination as to the presence or absence of an obstacle in front of the target vehicle that is moving autonomously along the traveling trajectory is made based on the sensing information received from the infrastructure sensor 200A. Then, if an obstacle is detected, the target vehicle is controlled to apply emergency braking. It should be noted that the sensing information may be used for other processes.

According to the above-described second embodiment of the present invention, the infrastructure sensor 200A includes the infrastructure-side vehicle coordination part 203 configured to send the sensing information to the onboard device 300A, whereas the onboard device 300A includes the vehicle-side infrastructure coordination part 309 configured to receive the sensing information transmitted from the infrastructure sensor 200A. The vehicle control part 308 uses the sensing information received by the vehicle-side infrastructure coordination part 309 to control a motion of the target vehicle that is caused to move autonomously along the traveling trajectory. Consequently, it is possible to cause the target vehicle to move autonomously along the traveling trajectory even if the target vehicle does not have the highly accurate map information 306 and the onboard sensor 31.

In the examples described in the above-described embodiments of the present invention, the resetting determination part 110 executes the processes illustrated in FIG. 3 to determine whether to reset the traveling trajectory of the target vehicle. However, the present invention is not limited to such examples. Alternatively, at least one of steps S201, S203, and S206 may be omitted, for example. Further alternatively, a process that is not step S201, S203, or S206 may be added. There may be a case where it becomes difficult for the target vehicle to move autonomously due to changes in the ambient environment and accordingly it becomes necessary to reset the traveling trajectory. In such a case, it is possible to determine whether to reset the traveling trajectory of the target vehicle by any method, as long as the method can determine occurrence of such a situation in a reliable manner.

The above-described embodiments and various modifications are illustrated merely by way of examples. The present invention is not limited to these, as long as changes/modifications made to them do not impair the features of the present invention. In addition, although the foregoing has explained various embodiments and modifications, the present invention is not limited to these. Other possible modes within the scope of the technical idea of the present invention are also included in the scope of the present invention.

What is claimed is:

1. A server comprising:
    a central processing unit (CPU);
    a memory in communication with the CPU, the memory storing a plurality of instructions executable by the CPU to implement:
        a candidate trajectory generation part configured to generate a candidate traveling trajectory of a vehicle;
        a vehicle characteristic information storage part configured to store characteristic information of the vehicle;
        a trajectory simulator configured to execute, on the candidate traveling trajectory generated by the candidate trajectory generation part, a trajectory simulation involving use of the characteristic information;
        a trajectory evaluation part configured to determine a traveling trajectory along which the vehicle is caused to move autonomously, based on a result of the trajectory simulation performed by the trajectory simulator;
        a vehicle coordination part having a communication function to communicate with an onboard device mounted on the vehicle and being configured to transmit information of the traveling trajectory determined by the trajectory evaluation part to the onboard device;
        an infrastructure coordination part having a communication function to communicate with an infrastructure sensor which is configured to generate sensing information about an area surrounding the traveling trajectory, and being configured to obtain the sensing information from the infrastructure sensor;

an ambient environment generation part configured to generate information indicating an ambient environment of the traveling trajectory, based on the sensing information obtained by the infrastructure coordination part;

a resetting determination part configured to determine whether to reset the traveling trajectory, wherein
the trajectory simulator executes the trajectory simulation again with use of the information indicating the ambient environment generated by the ambient environment generation part, in a case where the resetting determination part determines to reset the traveling trajectory,
the trajectory evaluation part determines a new traveling trajectory of the vehicle based on a result of the trajectory simulation performed again by the trajectory simulator, and
the vehicle coordination part transmits, to the onboard device, information of the new traveling trajectory determined by the trajectory evaluation part.

2. The server according to claim 1, wherein
the resetting determination part determines to reset the traveling trajectory, in a case where information indicating that the autonomous movement along the traveling trajectory is impossible is transmitted from the onboard device.

3. The server according to claim 1, wherein
the resetting determination part determines presence or absence of an obstacle interfering with the traveling trajectory based on the sensing information, and determines whether to reset the traveling trajectory based on a result of the determination.

4. The server according to claim 1, wherein
the resetting determination part sets a region of a predetermined range including the traveling trajectory, and determines to reset the traveling trajectory in a case where a position of the vehicle deviates from the region.

5. The server according to claim 4, wherein
the candidate trajectory generation part generates a plurality of candidate traveling trajectories, and
the resetting determination part sets the region based on a position of a certain candidate traveling trajectory having been selected from among the plurality of candidate traveling trajectories, the certain candidate traveling trajectory being determined by the trajectory evaluation part as one along which the vehicle is capable of traveling, the certain candidate traveling trajectory being separated farther away from the traveling trajectory than any other candidate traveling trajectories.

6. The server according to claim 1, wherein
the resetting determination part identifies paired left and right candidate traveling trajectories separated the farthest away from each other laterally across the traveling trajectory in which the vehicle is currently traveling.

7. The server according to claim 1, wherein
the vehicle characteristic information comprises at least one of:
vehicle size, vehicle weight, vehicle yaw inertia moments, distances between vehicle axles, vehicle gravity center position, and vehicle cornering power.

8. A vehicle control system comprising:
a server configured to set a traveling trajectory along which a vehicle is caused to move autonomously;
an onboard device mounted on the vehicle; and
an infrastructure sensor capable of generating sensing information about an area surrounding the traveling trajectory, wherein
the server comprises:
a central processing unit (CPU);
a memory in communication with the CPU, the memory storing a plurality of instructions executable by the CPU to implement:
a candidate trajectory generation part configured to generate a candidate traveling trajectory of the vehicle,
a vehicle characteristic information storage part configured to store characteristic information of the vehicle;
a trajectory simulator configured to execute, on the candidate traveling trajectory generated by the candidate trajectory generation part, a trajectory simulation involving use of the characteristic information,
a trajectory evaluation part configured to determine a traveling trajectory based on a result of the trajectory simulation performed by the trajectory simulator,
a vehicle coordination part having a communication function to communicate with the onboard device and being configured to transmit information of the traveling trajectory determined by the trajectory evaluation part to the onboard device,
an infrastructure coordination part having a communication function to communicate with the infrastructure sensor and being configured to obtain the sensing information from the infrastructure sensor,
an ambient environment generation part configured to generate information indicating an ambient environment of the traveling trajectory, based on the sensing information obtained by the infrastructure coordination part, and
a resetting determination part configured to determine whether to reset the traveling trajectory, wherein
the infrastructure sensor comprises:
a sensor part configured to generate the sensing information, and
an infrastructure-side server coordination part configured to transmit the sensing information to the server, the onboard device comprises:
a vehicle-side server coordination part configured to obtain information of the traveling trajectory from the server, and
a vehicle control part configured to cause the vehicle to move autonomously along the traveling trajectory based on the information of the traveling trajectory obtained by the vehicle-side server coordination part,
the trajectory simulator executes the trajectory simulation again with use of the information indicating the ambient environment generated by the ambient environment generation part, in a case where the resetting determination part determines to reset the traveling trajectory,
the trajectory evaluation part determines a new traveling trajectory of the vehicle based on a result of the trajectory simulation performed again by the trajectory simulator, and the vehicle coordination part transmits, to the onboard device, information of the new traveling trajectory determined by the trajectory evaluation part.

9. The vehicle control system according to claim 8, wherein
the onboard device transmits predetermined information to the server, in a case where the autonomous movement along the traveling trajectory is determined to be impossible, and
the resetting determination part determines to reset the traveling trajectory, in a case where the predetermined information is transmitted from the onboard device.

10. The vehicle control system according to claim 8, wherein
the resetting determination part determines presence or absence of an obstacle interfering with the traveling trajectory based on the sensing information, and determines whether to reset the traveling trajectory based on a result of the determination.

11. The vehicle control system according to claim 8, wherein
the resetting determination part sets a region of a predetermined range including the traveling trajectory, and determines to reset the traveling trajectory in a case where a position of the vehicle deviates from the region.

12. The vehicle control system according to claim 11, wherein
the candidate trajectory generation part generates a plurality of candidate traveling trajectories, and
the resetting determination part sets the region based on a position of a certain candidate traveling trajectory having been selected from among the plurality of candidate traveling trajectories, the certain candidate traveling trajectory being determined by the trajectory evaluation part as one along which the vehicle is capable of traveling, the certain candidate traveling trajectory being separated farther away from the traveling trajectory than any other candidate traveling trajectories.

13. The vehicle control system according to claim 8, wherein
the infrastructure sensor includes an infrastructure-side vehicle coordination part configured to transmit the sensing information to the onboard device,
the onboard device includes a vehicle-side infrastructure coordination part configured to receive the sensing information transmitted from the infrastructure sensor, and
the vehicle control part uses the sensing information received by the vehicle-side infrastructure coordination part to control a motion of the vehicle that is caused to move autonomously along the traveling trajectory.

14. The vehicle control system according to claim 8, wherein
the resetting determination part identifies paired left and right candidate traveling trajectories separated the farthest away from each other laterally across the traveling trajectory in which the vehicle is currently traveling.

15. The vehicle control system according to claim 8, wherein
the vehicle characteristic information comprises at least one of:
vehicle size, vehicle weight, vehicle yaw inertia moments, distances between vehicle axles, vehicle gravity center position, and vehicle cornering power.

* * * * *